United States Patent [19]

Arfert et al.

[11] Patent Number: 4,498,575
[45] Date of Patent: Feb. 12, 1985

[54] METHOD AND APPARATUS FOR CONVEYING ARTICLES

[75] Inventors: Horst F. W. Arfert, Midlothian; Reynaldo P. Leyco, Chesterfield County, both of Va.

[73] Assignee: Reynolds Metals Company, Richmond, Va.

[21] Appl. No.: 588,199

[22] Filed: Mar. 12, 1984

Related U.S. Application Data

[62] Division of Ser. No. 419,573, Sep. 17, 1982, Pat. No. 4,473,027.

[51] Int. Cl.³ .............................................. B65G 47/24
[52] U.S. Cl. .................................. 198/400; 198/448; 53/154
[58] Field of Search ............... 198/400, 416, 451, 452, 198/460, 433, 445, 447, 448, 459; 53/154

[56] References Cited

U.S. PATENT DOCUMENTS

| | | | |
|---|---|---|---|
| 907,116 | 12/1908 | Baker | 198/416 X |
| 1,161,893 | 11/1915 | Schmedtje | 198/452 |
| 1,618,061 | 2/1927 | Cristiani | 198/416 X |
| 2,341,705 | 2/1944 | Fedorchak et al. | 198/459 |
| 2,678,124 | 5/1954 | Bergmann | 198/451 X |
| 3,144,119 | 8/1964 | Nigrelli et al. | 198/451 X |
| 3,224,551 | 12/1965 | Talbot et al. | 198/452 X |
| 3,251,452 | 5/1966 | Conway et al. | 198/460 |
| 3,752,293 | 8/1973 | Fort | 198/443 X |
| 4,004,677 | 1/1977 | Heter et al. | 198/452 |
| 4,231,465 | 11/1980 | Bourgeois | 198/460 |
| 4,265,356 | 5/1981 | Glover | 198/452 X |
| 4,355,712 | 10/1982 | Bruno | 198/460 |

FOREIGN PATENT DOCUMENTS

| | | | |
|---|---|---|---|
| 2317873 | 10/1973 | Fed. Rep. of Germany | 198/416 |
| 640529 | 5/1962 | Italy | 198/448 |
| 1137752 | 12/1968 | United Kingdom | 198/451 |

Primary Examiner—Joseph E. Valenza
Assistant Examiner—Jonathan D. Holmes
Attorney, Agent, or Firm—Alan T. McDonald

[57] ABSTRACT

A method and apparatus for conveying articles comprises a conveying surface, baffles for orienting the articles as they pass along the conveying surface into columns and a controller for selectively permitting articles from one of the columns to pass further along the conveying surface.

2 Claims, 15 Drawing Figures

METHOD AND APPARATUS FOR CONVEYING ARTICLES

This application is a division of Ser. No. 419,573 filed Sept. 17, 1982, now U.S. Pat. No. 4,473,027.

BACKGROUND OF THE INVENTION

Frozen novelty confectionaries, such as ice cream bars, are often formed with shell or coating of a candy-like material, such as chocolate. If the novelty bars do not have sticks inserted therein, the coating or enrobing process typically takes the form of conveying the frozen novelty along a metal mesh conveyor, with the conveyor passing under a "waterfall" of the melted coating material. This operation coats the top, front, back and sides of the bar. Slightly after passing of the novelty under the waterfall, the bottom of the novelty is contacted with a metal mesh conveyor or roller positioned within a bath of the coating material, to thereby coat the bottom portion of the novelty. The novelty is then passed to a chill tunnel for hardening of the coating material and is wrapped and packaged for shipment.

This enrobing system is economical, since the system includes apparatus for recapturing excess coating material from the waterfall which is not coated onto the novelties and recirculating this material. Low loss levels are thus the result.

While this system has been successfully employed with non-stick frozen novelties, the system has not met with success in the past with stick-type products. This is due, to the greatest degree, from the nature of the waterfall. The waterfall is continuous across the conveyor, which conveyor has a plurality of rows of novelties thereon, coating both the rows of novelties and the spaces therebetween, with the excess material passing through the metal mesh conveyor. If stick-type novelties were passed through such a system, the sticks, as well as the products, would be coated. Such a result is clearly unacceptable.

As a result, separate enrobing apparatus for coating stick-type novelties has been developed. Such enrobers are designed to dip or spray a stick-type novelty with the coating material while the novelty is held by its stick.

The dipping or spraying systems currently available have a number of drawbacks associated therewith. First, the systems are prone to splashing and/or spattering, due to the dipping action or the high-velocity spraying. Such is not the case in a gravity-type waterfall, where lower coating material velocities are employed. Thus, the dipping and spraying systems are "messy", i.e., a significant quantity of a coating material is not recaptured by the recirculation system. Rather, a significant quantity of this coating material winds up on the floor, walls and other components of the system. Such a result has the obvious impact of increasing maintenance and cleanup time, thereby increasing downtime for the system. Equally important, the lost coating material is wasted, thus increasing the cost of the novelty to the consumer.

There are other disadvantages associated with enrobing apparatus that require the product to be held by its stick during enrobing. Such a system requires that all novelties be oriented identically as they arrive to the enrobing means, so that the sticks thereof can be captured by the system. This limits the number of novelties that can be handled on the conveying apparatus upon which the products are initially extruded and passed to a freezer. Also, there is the chance of a novelty falling from the grasp of the enrobing apparatus and thus becoming waste.

It is thus a primary objective of the present invention to provide a method and apparatus for enrobing stick-type confectionary novelties using a waterfall enrobing apparatus.

It is also a primary objective of the present invention to enrobe stick-type confectionary novelties in a waterfall-type enrober without coating of the sticks.

It is also a primary objective of the present invention to provide a method and apparatus for enrobing stick-type novelties which do not require the novelties to be held by their sticks during coating thereof.

It is another primary objective of the present invention to increase the productivity of the novelty producing system by increasing the number of novelties which may be extruded onto its conveying mechanism and successfully handled by the system.

THE PRESENT INVENTION

By means of the present invention, the above-stated objectives are obtained.

The method of the present invention comprises raking confectionaries from a freezer conveyor, spacing the confectionaries along a conveyor, passing confectionaries under a waterfall of coating material, baffling the stick portions of the confectionaries to prevent coating of the sticks, and coating of the bottom of the confectionary.

The apparatus of the present invention includes a rake-off mechanism for removing the confectionaries from the freezer conveyor, a belt conveyor having a plurality of belts angled with respect to one another to orient the confectionaries into a plurality of spaced rows and a waterfall enrober having baffle means positioned therein to protect the stick portions of the confectionaries from being coated.

Additional conveying means, including a baffled belt conveyor, are also disclosed, for transporting the enrobed product for further processing.

When employing the method and apparatus of the present invention, increased line productivity is obtained by permitting denser packing of the freezer conveying means. Further, by employing a gravity waterfall mechanism for enrobing stick-type products, reduced waste of the coating material and downtime for maintenance and cleaning results, due to reduced splashing and/or spattering of the coating material.

These and other objectives of the present invention will become apparent from the following description of the invention.

BRIEF DESCRIPTION OF THE DRAWINGS

The method and apparatus of the present invention will be more fully described with reference to the drawings in which.

DETAILED DESCRIPTION OF THE PREFERRED EMBODIMENTS

Figure 1:
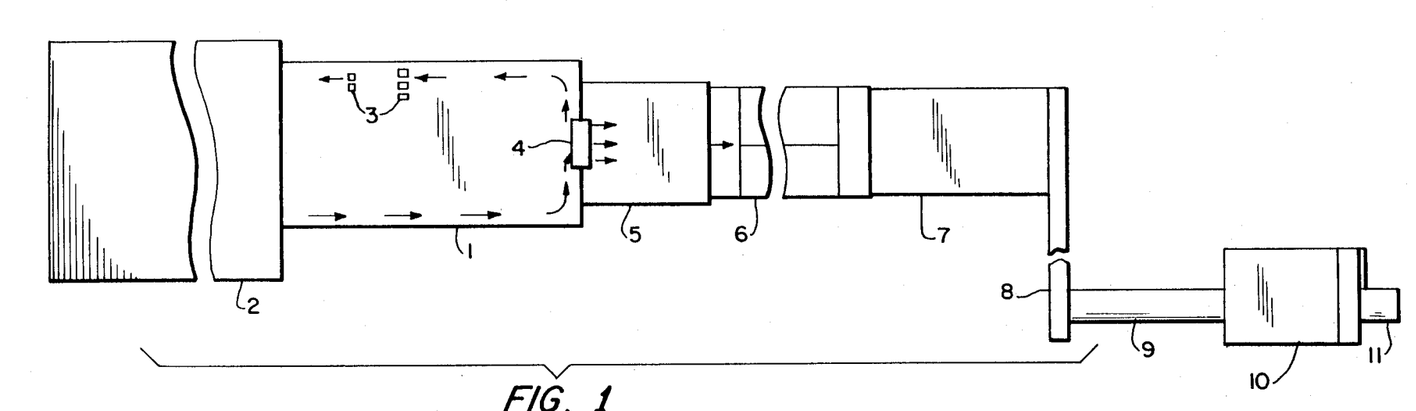
FIG. 1 is a schematic representation of an ice cream novelty product production line.

FIG. 1 diagramatically illustrates a frozen novelty forming system which employs the method and apparatus of the present invention.

Figure 7:
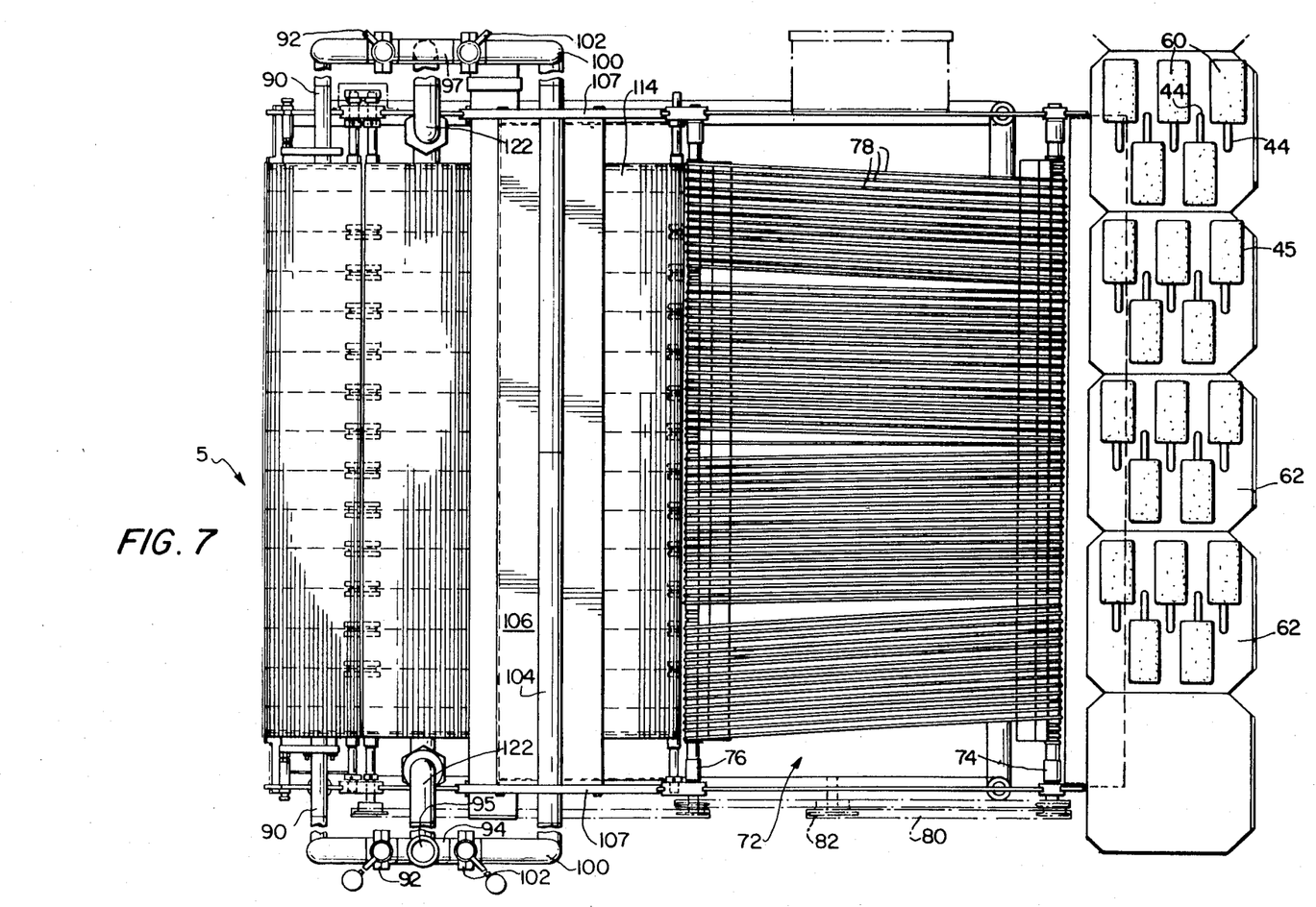
FIG. 7 is a top elevational view of the enrobing apparatus.

A conveying station 1 is positioned at one end of a freezer 2. The conveying mechanism preferably comprises a plurality of trays 62, as shown in FIG. 7, which are formed into an endless conveyor. This conveyor enters and exits freezer 2 at one end thereof and has sufficient length within freezer 2 to hold the novelty confectionaries therein a sufficient length of time to harden the product. Such apparatus are common and do not form a part of the present invention. A typical freezer-conveying mechanism apparatus which may be employed according to the present invention is also illustrated in U.S. Pat. No. 3,648,625.

Positioned over the conveyor trays 62, just prior to the entry of the trays 62 into freezer 2, are a plurality of novelty extruders 3. As illustrated in FIG. 1, five extruders 3 are positioned to extrude novelties onto a single tray 62. The details concerning this apparatus will be described below. The novelties extruded from extruders 3 enter freezer 2 and, as previously mentioned, are held for a period of time sufficient to thoroughly harden the product.

Eventually, the now frozen novelties exit freezer 2 and pass along conveying station 1 and under rake 4. Rake 4 removes the products from the trays 62 and passes them to spacing conveyor and enrober 5, where the novelties are spaced and coated.

Next, the novelties are passed to chill tunnel 6 where the novelties are cooled to harden the coating material prior to further processing. The novelties next pass to collator conveyor 7 where they are oriented into a single file, and then pass along conveyors 8 and 9 to packing station 10, finally leaving the system along conveyor 11.

Figure 2:
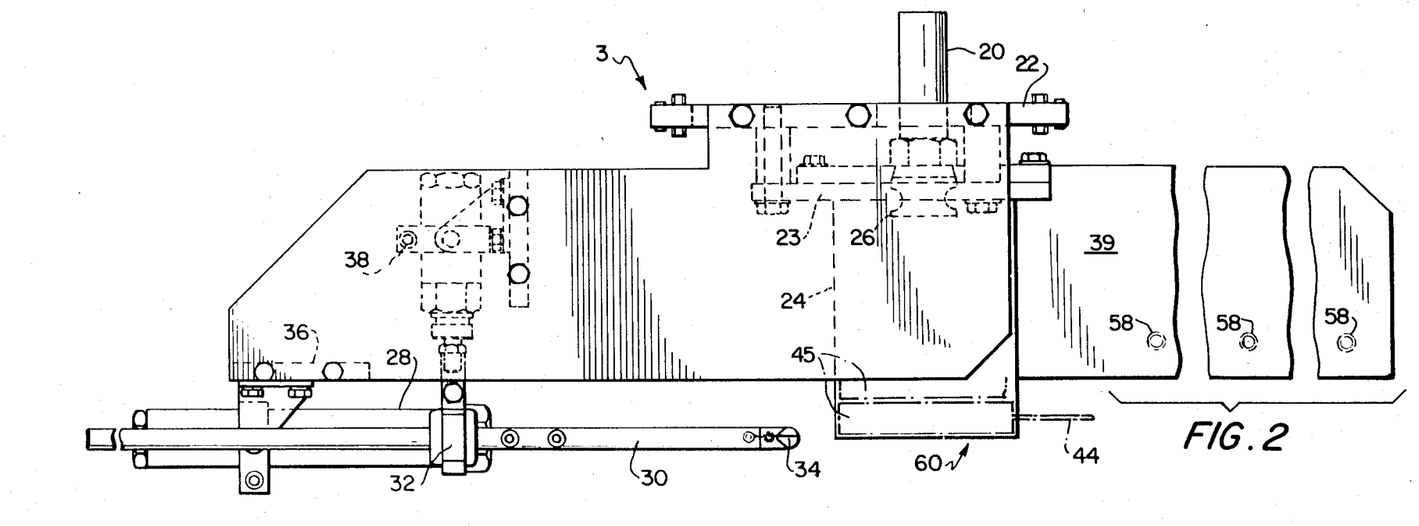
FIG. 2 is a front elevational view of the ice cream extruding and cut-off apparatus.
Figure 3:
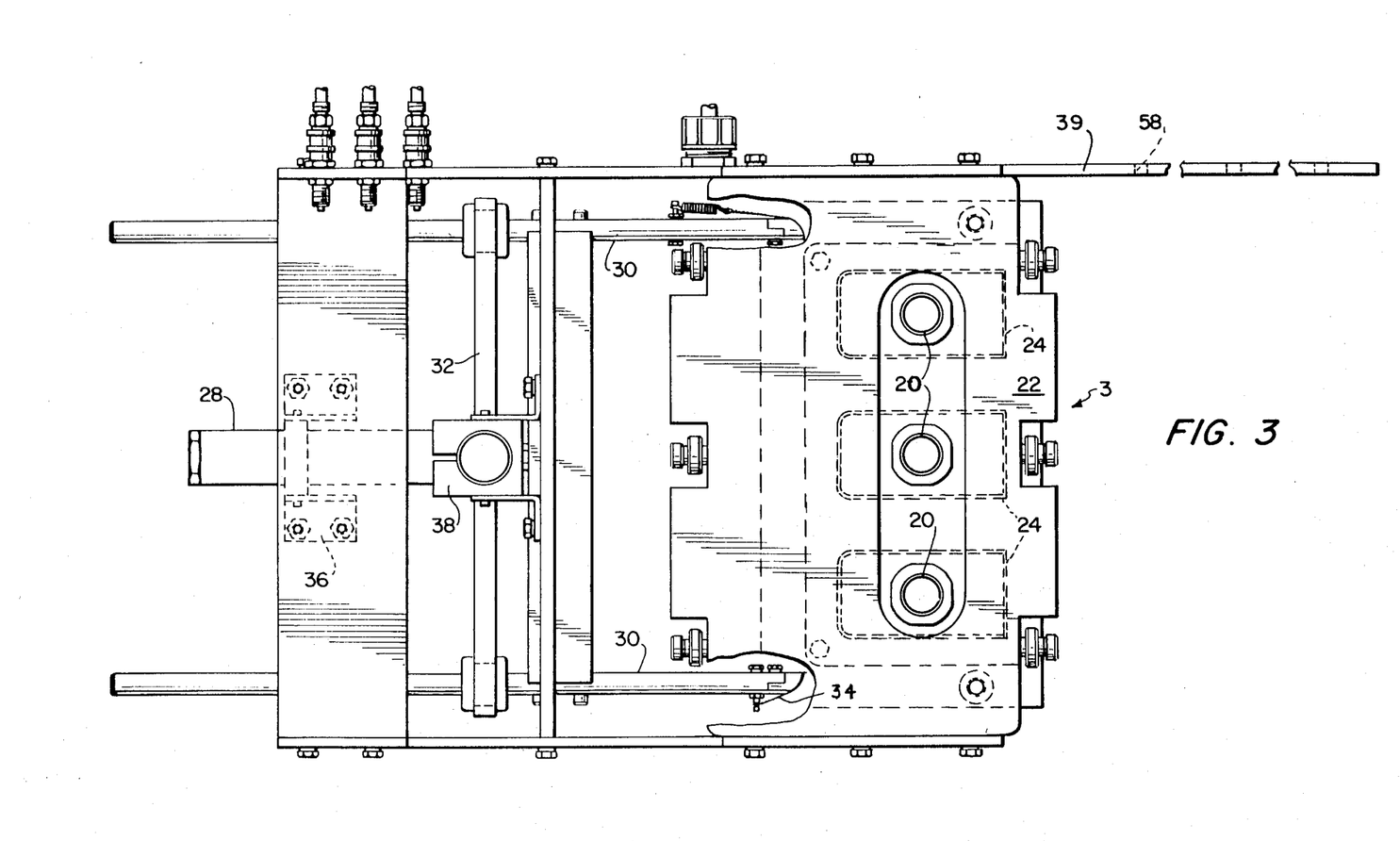
FIG. 3 is a top elevational view of the ice cream extruding and cut-off apparatus.

FIGS. 2 and 3 illustrate the frozen novelty extrusion and cut-off apparatus 3. Entry tubes 20 are attached to the source of product (not shown). The product is pumped to tubes 20 in a semi-hardened state, such that the product will hold a shape, but soft enough that it may be molded. The entry tubes 20 are connected to molds 24. Entry tubes 20 and molds 24 are held in place by being fastened between top plate 22 and bottom plate 23. The molds 24 make take any of numerous shapes, such as round, oval, square, rectangular, animal shapes, etc. For simplicity, the molds 24 are shown as rectangles, having rounded corners along one end thereof. This is by far the most common shape for stick-type ice cream bar novelties. As the molds 24 are filled, the ice cream product 45 is extruded through the end of the mold 24 but, due to its nature, adheres to the remainder of the product 45 within mold 24.

At properly timed intervals, air cylinder 28 is advanced and rods 30, which are connected to air cylinder 28 by means of mounting bracket 32 attached to air cylinder 28, are advanced. A heated wire 34 melts and cuts the novelty bar 60, and the novelty 60 drops onto the conveyor tray 62.

Figure 4:
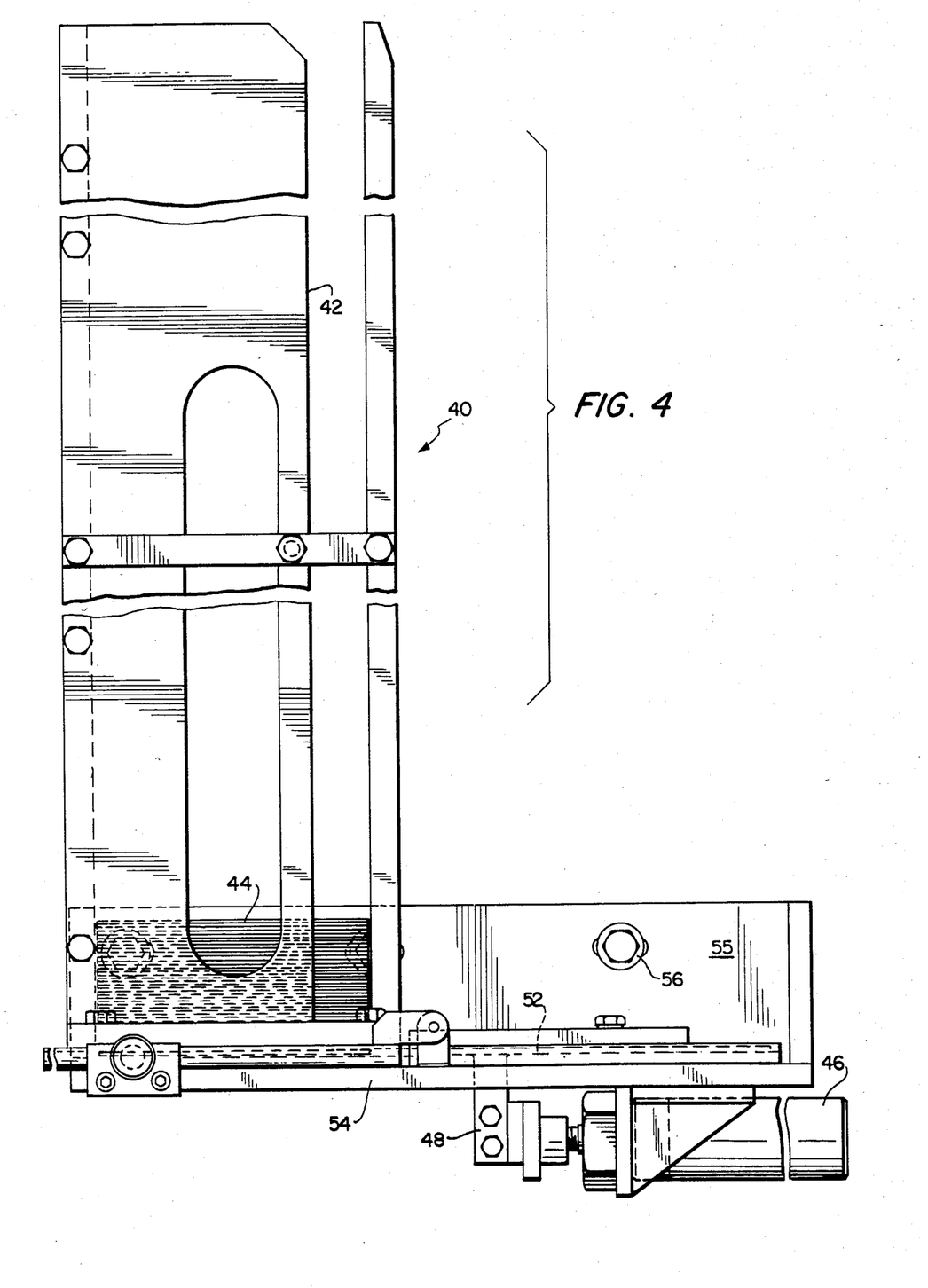
FIG. 4 is a front elevational view of the stick hopper and inserting apparatus.
Figure 5:
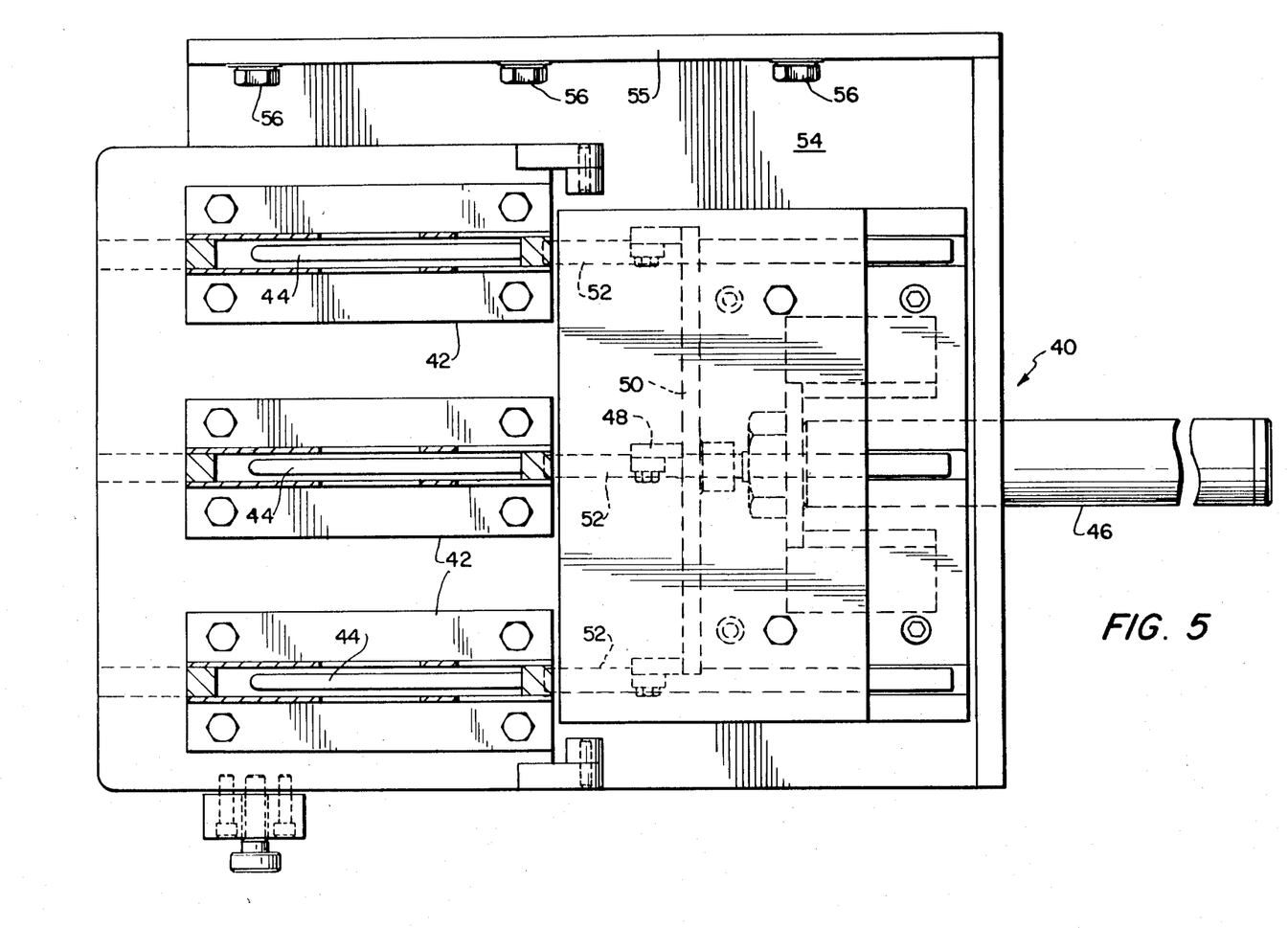
FIG. 5 is a top elevational view of the stick inserting apparatus.

Just prior to the action of wire 34, a stick inserter 40, illustrated in FIGS. 4 and 5, inserts a stick 44 into the product 45.

Stick hoppers 42 carry a plurality of vertically stacked sticks 44 therein. At the appropriate time, as determined a timing means linking stick inserter 40 and wire 34 (not shown), air cylinder 46 is extended, forcing linking bracket 48, connecting bar 50, and push rods 52 forward. The push rods 52 force sticks 44 out of stick hoppers 42 and into the ice cream product 45.

Stick inserter 40 is mounted adjacent extrusion apparatus 3 by means of bolts 56 passing through back plate 55 of stick inserter 40 and bolted to openings 58 in the back plate 39 of the molding apparatus 3.

While the molding and stick inserting apparatuses illustrated in FIGS. 2 through 5 are illustrated to accommodate the formation of three bars simultaneously, it is clear that fewer or more bars could be formed by the rearrangement of the component parts of the apparatuses. Thus, in FIG. 1, a three bar molding system is illustrated adjacent a two bar molding system, with the result that five bars are placed on a given tray 62 of the freezer conveying mechanism 1.

It should also be noted that, as previously mentioned, mold 24 could be replaced to form different shapes. Some of these shapes would not require sticks. In that event, stick inserter 40 would be deactivated without affect on the balance of the system.

Figure 6:
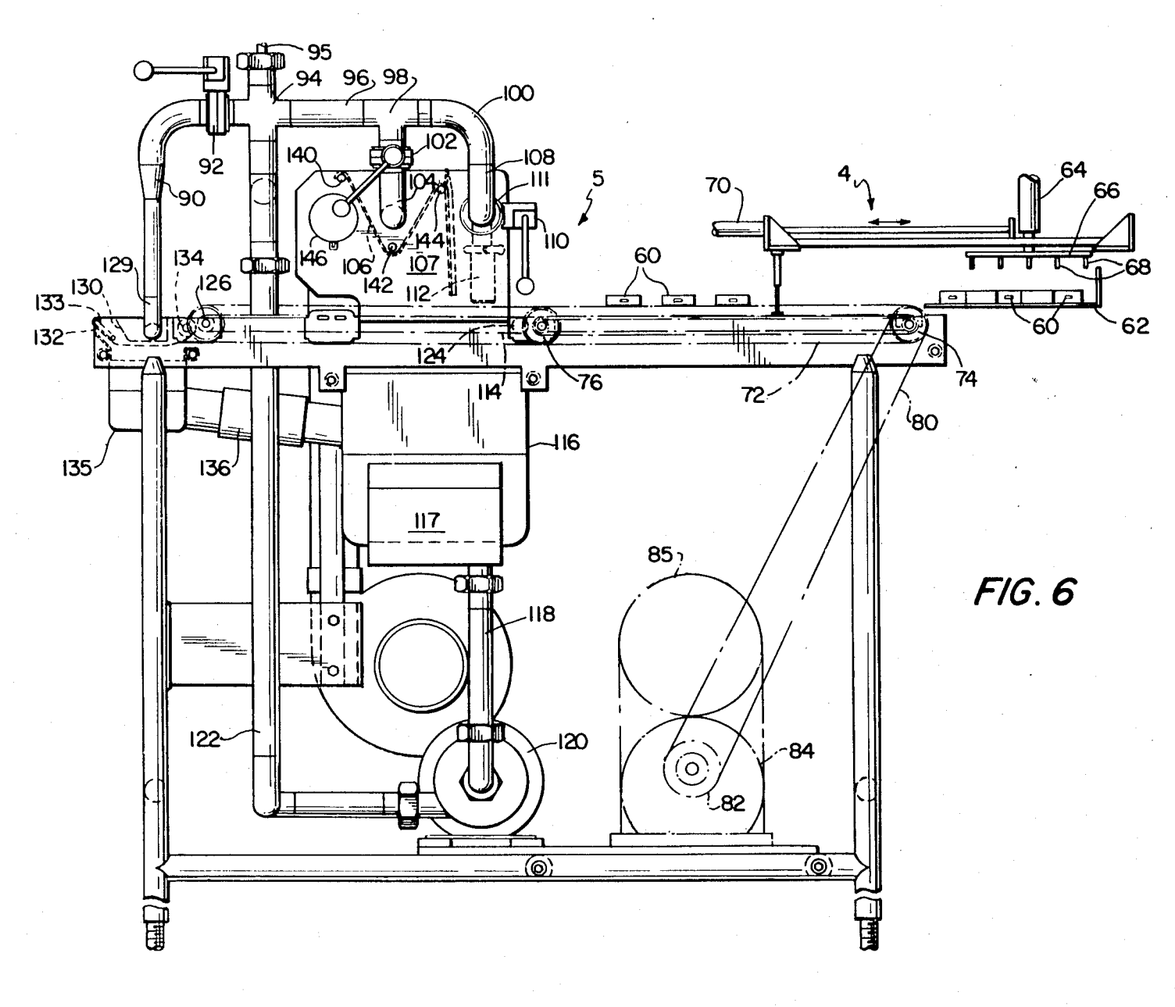
FIG. 6 is a front elevational view of the enrobing apparatus and rake-off mechanism.

FIG. 6 illustrates a typical rake-off mechanism 4 which removes the frozen bars from the freezer conveying mechanism 1 and positions them onto the enrobing apparatus 5.

Novelty bars 60, comprising product 45 and sticks 44 mounted therein, are carried along conveying mechanism 1 on trays 62. As can best be seen in FIG. 7, the sticks 44 of a given row of bars 60 overlap into the product 45 of the opposing row of bars 60. Thus, any attempt to coat the bars 60 with a waterfall of coating material at this point would coat both product 45 and sticks 44.

To remove the bars 60 from trays 62, the rake-off mechanism 4 illustrated in FIG. 6 is employed. The mechanism includes an air cylinder 64, which is timed to extend rake 66 downwardly at intervals, such as that illustrated in FIG. 7, when a complete row of filled trays 62 is present. As illustrated, a complete row comprises three trays 62. Rake 66 is lowered, and fingers 68 thereof pass between bars 60. As is readily apparent, the shape of rake 66 and the positioning of fingers 68 thereon may vary, according to the type of novelty 60 being produced. At this point, and while rake 66 is still lowered, air cylinder 70 is retracted, pulling rake 66 and positioning the bars 60 onto conveyor 72. After the bars 60 are positioned on conveyor 72, air cylinder 64 is retracted, raising rake 66, to enable rake 66 to clear the bars 60, and air cylinder 70 is extended, to return rake 66 to its ready position for the next group of trays 62.

The conveyor 72 comprises a pair of shafts 74 and 76 and a plurality of belts 78 positioned therebetween. Shaft 74 is driven by means of belt or chain 80 which is connected to pulley 82, which is in turn connected to motor 84. A variable speed drive 85 controls the speed of motor 84.

Shafts 74 and 76 are preferably grooved to hold belts 78 in alignment therebetween. Belts 78 may be, for example, rubber or plastic tubular belts, such as o-ring belts.

The belts 78 are oriented as a series of pairs, with each pair accommodating the novelty bars 60 of a given tray 62. Each pair of belts 78 is divergent from the entry point of the bars 60 onto conveyor 72 at pulley 74 to their point of exit from conveyor 72 at pulley 76. This action spreads the rows of bars laterally, such that the sticks 44 no longer overlap into the product 45 of adjacent bars 60 when the bars 60 reach pulley 76. At this point, the bars 60 are ready for enrobing.

The enrobing apparatus 5 includes a tank 116 which is filled with the coating product. Tank 116 may be filled manually, or may be continually fed by means not shown. Heater 117 maintains the coating product within tank 116 at a suitable coating temperature. The coating material is circulated through the system by means of exit pipe 118, pump 120, and pipe 122. Pipe 122 feeds T-shaped fitting 97 at the rear and X-shaped fitting 94 at the front of the enrober 5. The only difference between fittings 97 and 94 is the addition of a connection for temperature sensor 95 at the front of the enrober 5. From fittings 94 and 97, the coating product passes through lines 96 and T-shaped fittings 98. Part of the coating product passes through elbows 100, pipe 108 and valve 110. Valve 110 controls flow of the coating product to side coaters 112, which will be more fully described below. Valve 102 controls flow from fittings 98 to a pipe 104. Pipe 104 includes a plurality of openings therein, permitting the coating product to fill a generally V-shaped waterfall mechanism 106, which is positioned between splash plates 107. The operation of the waterfall 106 will be more fully described below.

At the other end of fittings 94 and 97, valves 92 control flow of the coating product through line 90 and exit pipe 129 to a bottom forming station. The bottom forming station will be more fully described below.

In operation, the bars 60 are passed from conveyor 72 to conveyor 114. Conveyor 114 comprises a pair of pulleys 124 and 126 which are driven by means not shown and a metal mesh conveying surface. First, the bars 60 pass between the plurality of side coaters 112 descending from pipe 111 and activated or deactivated by means of valve 110. If the product is a stick-type product, as illustrated, the side coating system 112 is deactivated. If, however, other products, such as an ice cream-cookie sandwich, in which the cookies extended beyond the ice cream, such that material coated on top of the cookie will not flow into the side areas of the sandwich, is to be enrobed, side coaters 112 are employed to coat these side portions.

Figures 8, 9, 10:
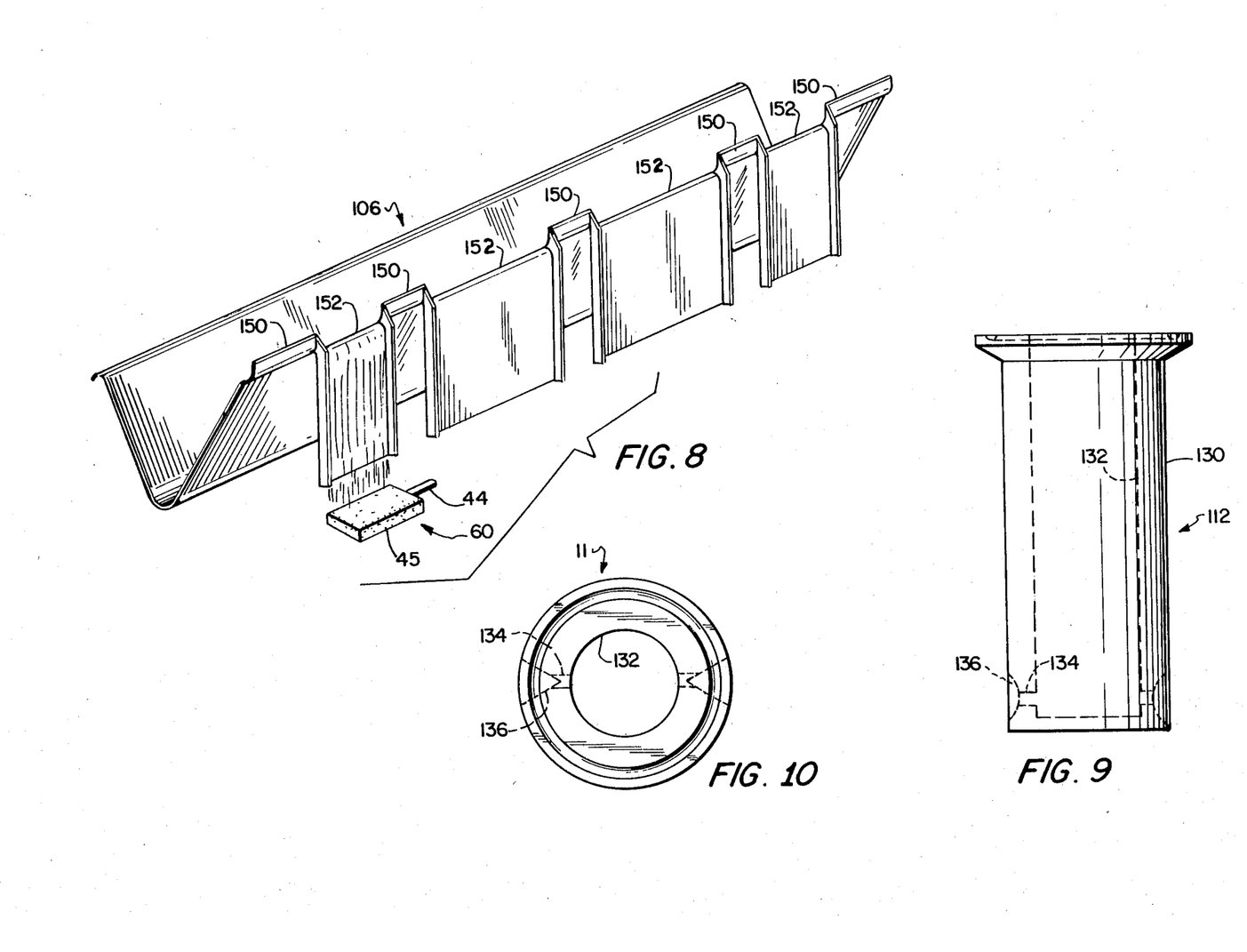
FIG. 8 is a perspective view of the waterfall mechanism.
FIG. 9 is a front elevational view of a side coating mechanism.
FIG. 10 is a top elevational view of the side coating mechanism.

Side coaters 112 are illustrated in FIGS. 9 and 10. These units 112 comprise tubes 130 having a central opening 132 which communicates by means of side openings 134 with outlets 136. Depending upon whether the side coater 112 is a central unit or an end unit, either two or one exit nozzles 136 are present. The side coaters 11 may be formed of metal tubing, but are readily formed of molded plastics.

Next, the novelty 60 passes under waterfall 106. Waterfall 106 is supported by means of rods 140, 142 and 144 and is mounted between splash guards 107. Waterfall 106 comprises a generally V-shaped trough into which exit pipe 104 is positioned. The coating product, metered by means of valve 102, exits openings in exit pipe 104, filling the V-shaped trough and overflowing at the point over support rod 144. As can best be seen in FIG. 8, the waterfall 106 includes a plurality of baffles 150 and a plurality of troughs 152. The coating product cascades downwardly by gravity along troughs 152. Due to the orientation of the bars 60, as provided by means of conveyor 72, the novelty product 45 is coated, while the majority of the stick 44, passing under baffle 150, is protected, providing a clean handle for holding the finished bar 60.

After passing under the waterfall 106, the bars 60 pass under an air blower 146, where excess coating product is removed. All excess coating product from side coater 112, waterfall 106 and blower 146 are collected in tank 116 for recirculation, as previously described.

The bars 60 exit conveyor 126 and pass onto conveyor 133. Conveyor 133 is positioned between driven pulley 134 and stationary knife pulley 132. A trough 130 is fed coating product by means of exit pipe 129 having openings therein, similar to exit pipe 104 previously described, which is connected by means of line 90 and valve 92 to the recirculating portion of the enrober 5. Trough 130 is permitted to overflow, providing a crown of coating product, due to surface tension. Metal mesh belt 132 is not completely taut, providing a slight dipping action of the bottom of the bar 60 into the coating product, providing coating on the bottom surface thereof. The overflow from trough 130 is caught in tank 135 and transferred by means of line 136 to tank 116 for recirculation.

Figure 11:
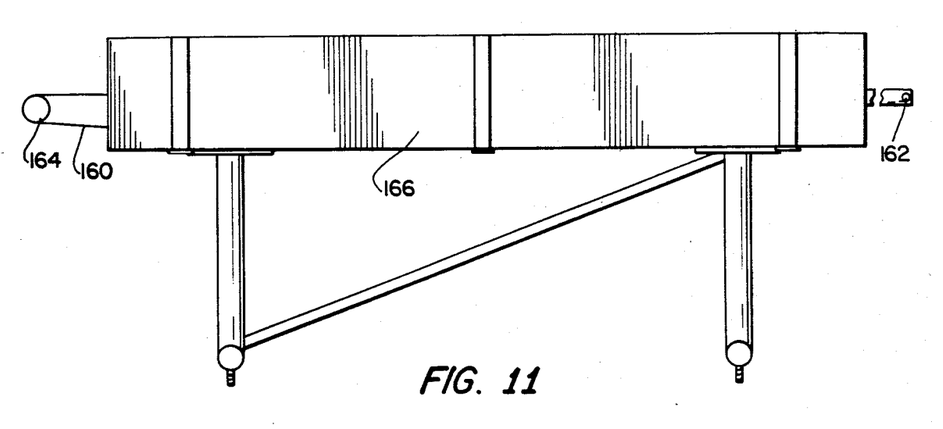
FIG. 11 is a front elevational view of a chill tunnel.
Figure 12:
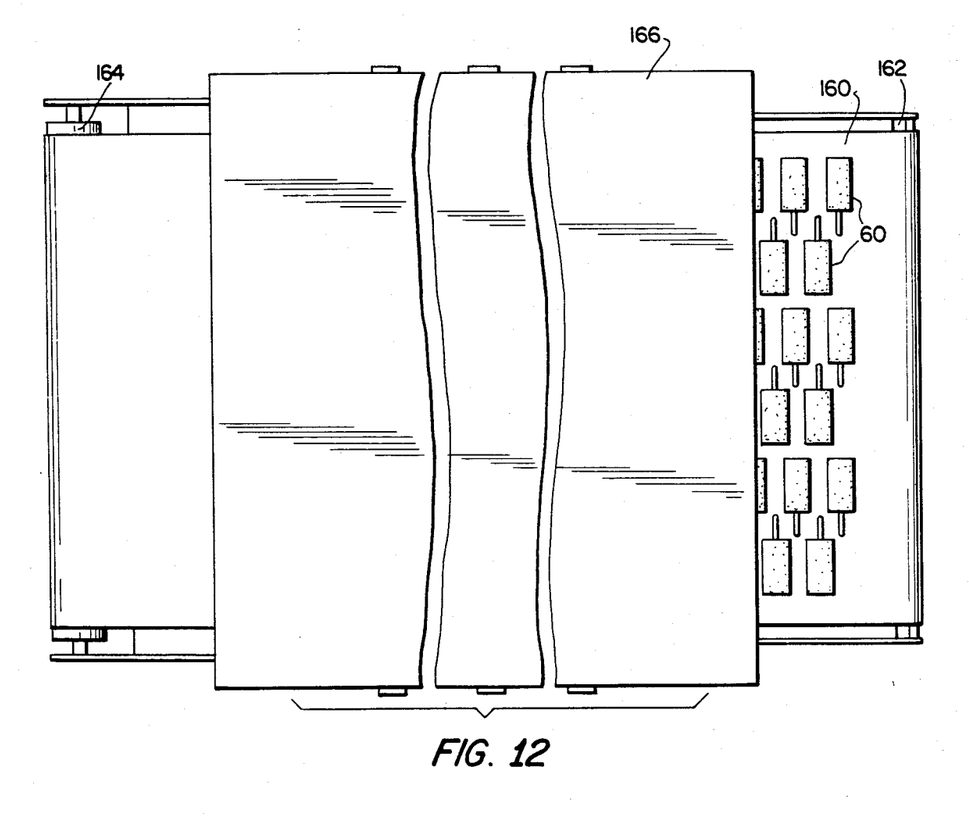
FIG. 12 is a top elevational view of the chill tunnel.

FIGS. 11 and 12 illustrate the chill tunnel through which the bars 60 pass from conveyor 133. A conveyor belt 160 mounted between pulleys 162 and 164 and driven by conventional motor means (not shown) passes the bars 60 into a chill tunnel 166, where the coating product is hardened prior to packaging. Chill tunnel 166 may operate at a temperature in the range of about $-10°$ to $-30°$ F. ($-23.3°$ to $-34.4°$ C.).

Figure 13:
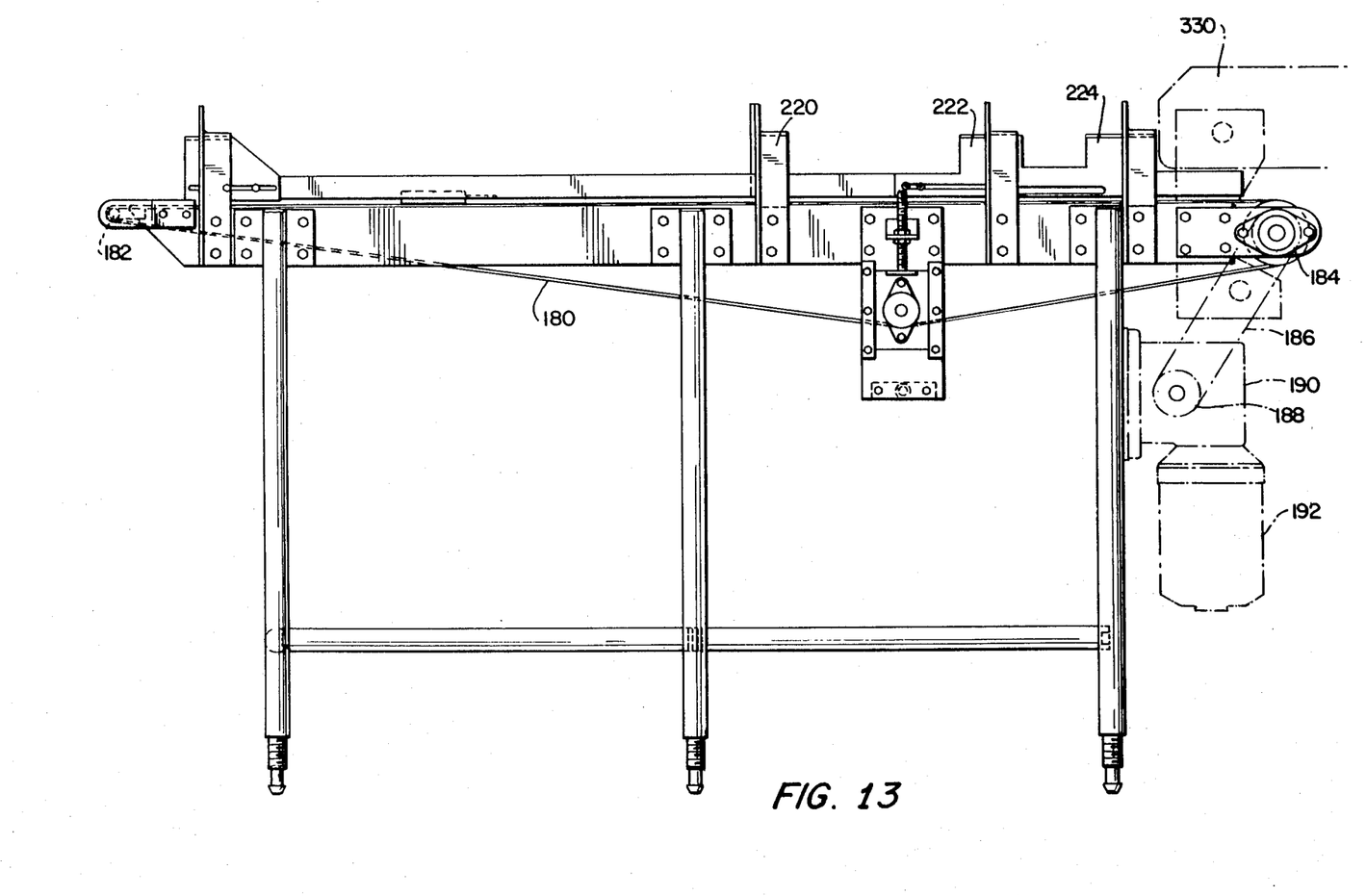
FIG. 13 is a front elevational view of a conveying and collator apparatus.
Figure 14:
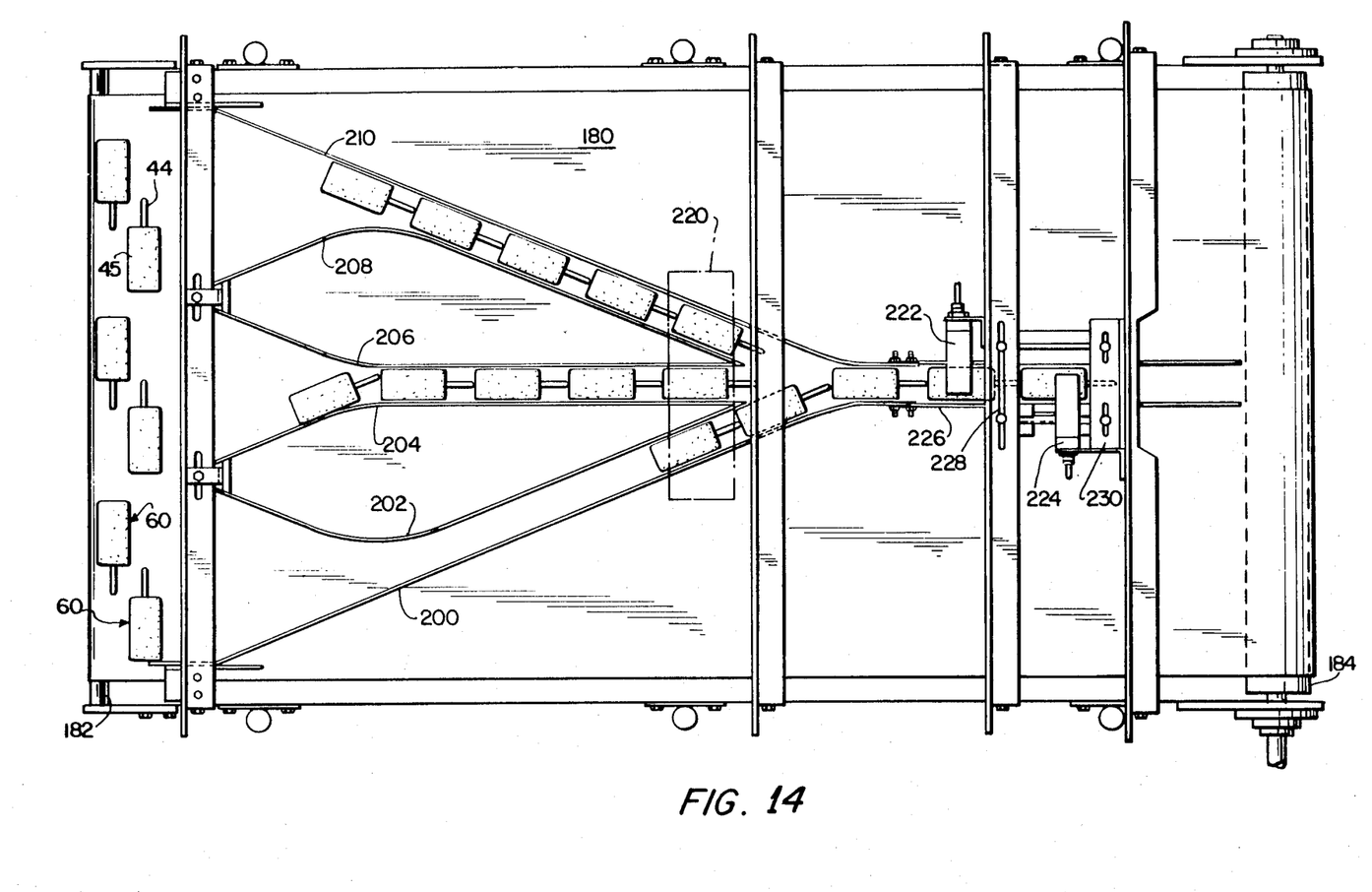
FIG. 14 is a top elevational view of the collator apparatus.

FIGS. 13 and 14 illustrate the collator mechanism for the bars 60. A belt conveyor 180 comprises a pair of pulleys 182 and 184, which are driven by means of chain or belt 186 connected between pulley 184 and a pulley 188 of a gear box 190 connected to motor 192. Novelties 60 exiting chill tunnel 166 from belt 160 at pulley 164 are transferred onto belt 180, and as they are carried along belt 180 contact the walls of one of the baffle plates 200, 202, 204, 206, 208 or 210 positioned slightly above belt 180. These baffle plates 200 through 210 contact the product 45, rather than stick 44. The baffle plates 200 through 210 may include guide rails mounted thereon at the height of the bars 60, reducing the amount of contact between the baffle plates 200 through 210 and the bars 60. The frictional forces between the product 45 and the plate 200 through 210 which it contacts turns the product, such that the product is then guided into a row formed between adjacent baffle plates.

At a point slightly before the lanes converge to a single lane, a photocell unit generally illustrated at 220 operates. The photocells within unit 220 are not illustrated, however, photocells 222 and 224 illustrated over the convergent single lane 226 illustrate the form of apparatus employed. The photocells within unit 220 operate air cylinders and stop bars, similar to those illustrated at points 228 and 230, to hold the bars 60 in their respective lanes. The cylinder connected to one lane is opened, permitting a number (as illustrated five) bars 60 to pass through, at which time the second, and then the third lane feeds a number (in the case illustrated five) bars 60 to the single lane 226. Once in the single lane, a bar 60 first passes under photoelectric cell 222. If a bar 60 is under second photoelectric cell 224, the stop bar at point 228 associated with photoelectric cell 222 is closed, until the bar 60 under photoelectric cell 224 has passed therethrough and a slight time delay thereafter has occurred. After the bar 60 passes under photoelectric cell 224 and a slight time delay thereafter, the stop bar at point 228 associated with photoelectric cell 222 is opened and the stop bar at point 230 associated with photoelectric cell 224 closes, stopping the forward motion of the bar 60 under the second photoelectric cell 224 until a sufficient time has passed to space the initial bar under photoelectric cell 224.

Figure 15:
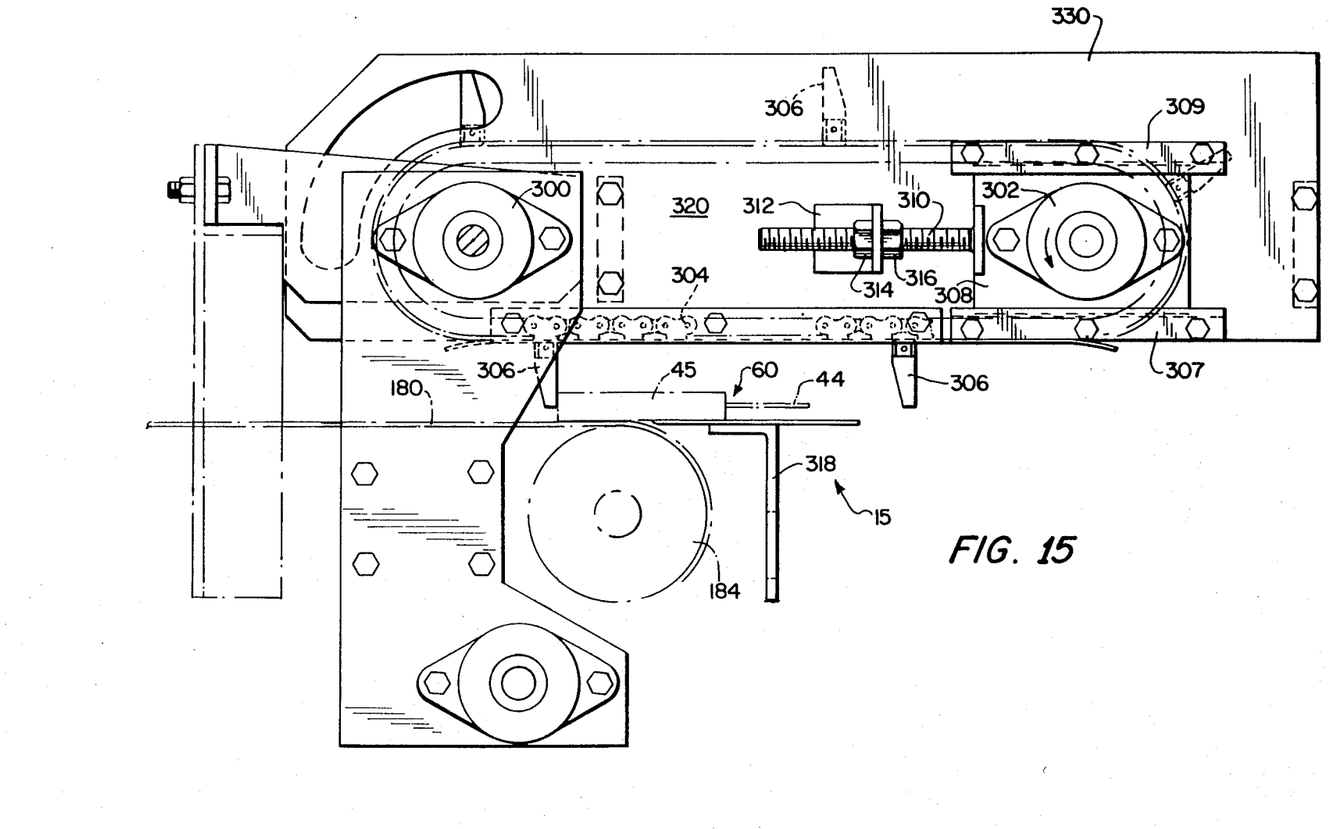
FIG. 15 is a front elevational view of a rake-off mechanism of the collator apparatus.

The bars 60 may pass to a conveyor 8 as illustrated in FIG. 1 from conveyor belt 180, either by the forward motion of belt 180, or, they may be raked from belt 180 by a mechanism such as the rake-off 15 illustrated in FIG. 15. From there, the bars 60 pass to a conventional wrapping and packaging station 10, finally exiting the system along conveyor 11.

The rake-off mechanism for the collator is illustrated in FIG. 15. Positioned above belt 180 are a pair of pulleys 300 and 302 which are driven by means not shown and which include a chain 304 therebetween. Connected to chain 304 are a plurality of spaced pushers 306. The pushers 306 push bar 60 from conveyor 180 and onto plate 318. As movement of chain 304 continues, the bar 60 drops from plate 318 to another conveyor (not shown) which is positioned at an elevation somewhat lower than belt 180, such that pushers 306 may pass over bar 60 after its removal from plate 318.

Pulley 302 is mounted on plate 308 which is positioned between tracks 307 and 309. Plate 308 is positioned by means of bolt 310 which passes through connecting plate 312, which is in turn connected to backplate 320 and lock nuts 314 and 316. This adjustment system sets the tension on chain 304 for proper movement of the rake-off 15.

From the foregoing, it is clear that the present invention provides an efficient and logical system for enrobing and transporting novelty products from their formation to their packaging. While emphasis has been made with respect to stick-type products, since these products produce the greatest degree of problem and yet are handled effeciently by the system of the present invention, it is clear that the system of the present invention has equal utility with respect to non-stick products.

While the invention has been described with reference to certain specific embodiments thereof, it is not intended to be so limited thereby, except as set forth in the accompanying claims.

We claim:

1. Apparatus for conveying and reorienting articles having a major axis and a minor axis and which are oriented and conveyed in a direction parallel to their minor axis and positioned in a plurality of rows comprising a conveying surface, baffle means positioned above said conveying surface, said baffle means being constructed and arranged to contact the sides of successive articles in said rows to guide said articles along said conveying surface, reorient said articles along their major axis and combine said articles from adjacent ones of said plurality of rows into a plurality of columns, a first control means to selectively permit a plurality of said articles from said columns to advance to a passageway to thereby combine the articles from said plurality of columns into a single stream, and a second control means within said passageway to space said articles in said single stream as said articles exit said apparatus.

2. A method for conveying articles having a major axis and a minor axis and which are oriented along their minor axis and positioned in a plurality of rows comprising conveying said articles along a conveying surface in a direction parallel to their minor axis, contacting the sides of successive articles in said rows with a baffle means positioned above said conveying surface, guiding said articles along said conveying surface, reorienting said articles along their major axis, combining said articles from adjacent ones of said plurality of rows into a plurality of columns, selectively permitting a plurality of said articles from said columns to advance to a passageway to thereby combine the articles from said plurality of columns into a single stream, and spacing said articles in said single stream within said passageway prior to their exit from said conveying surface.

* * * * *